United States Patent [19]

Acda

[11] 4,097,070
[45] Jun. 27, 1978

[54] HIGH-STRENGTH PIPE COUPLING

[75] Inventor: Petrus Marinus Acda, Enkhuizen, Netherlands

[73] Assignee: Polva Nederland B.V., Enkhuizen, Netherlands

[21] Appl. No.: 736,156

[22] Filed: Oct. 27, 1976

[30] Foreign Application Priority Data

Oct. 27, 1975 Netherlands .......................... 7512515

[51] Int. Cl.² .............................................. F16L 21/02
[52] U.S. Cl. .................................... 285/86; 285/112; 285/322; 285/369
[58] Field of Search ................. 285/86, 112, 260, 322, 285/323, 369, 423, DIG. 16

[56] References Cited

U.S. PATENT DOCUMENTS

| 2,090,380 | 8/1937 | Terry | 285/323 |
| 2,449,795 | 9/1948 | Stillwagon | 285/112 X |
| 2,452,219 | 10/1948 | Bergvall et al. | 285/322 X |
| 3,352,577 | 11/1967 | Medney | 285/423 X |

FOREIGN PATENT DOCUMENTS

| 1,207,150 | 8/1959 | France | 285/369 |
| 1,310,713 | 10/1962 | France | 285/322 |
| 1,221,348 | 1/1960 | France | 285/112 |

*Primary Examiner*—Andrew V. Kundrat
*Attorney, Agent, or Firm*—Frank R. Trifari; Rolf E. Schneider

[57] ABSTRACT

Pipe coupling for the high-strength coupling of plastic pipe ends, a coupling sleeve having internal sawtooth ridges which mesh with counter profiles on the pipe ends.

5 Claims, 5 Drawing Figures

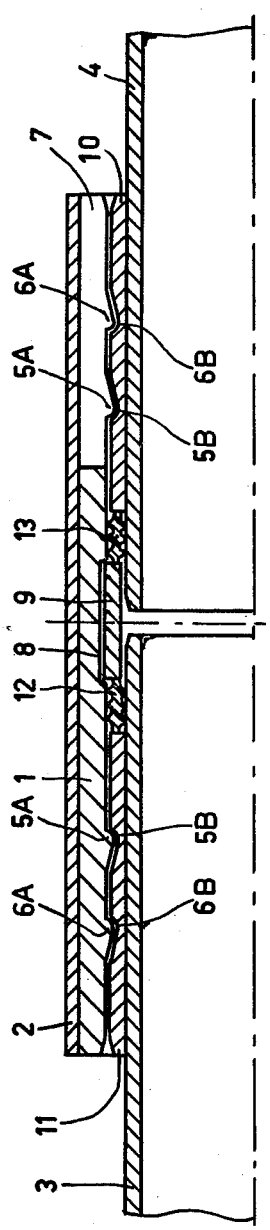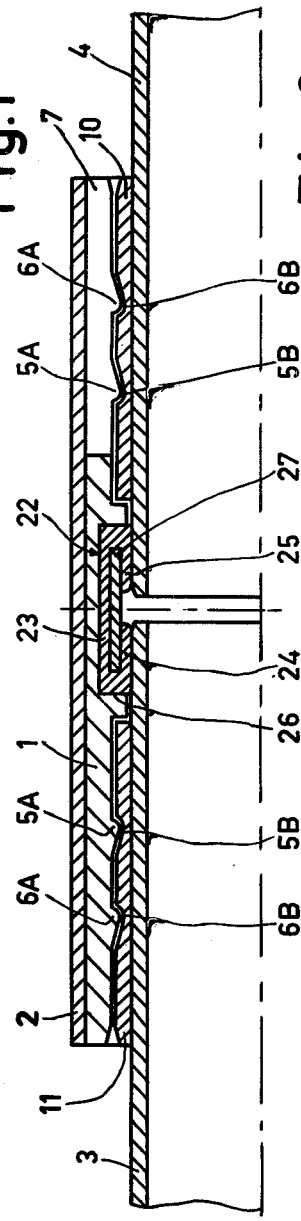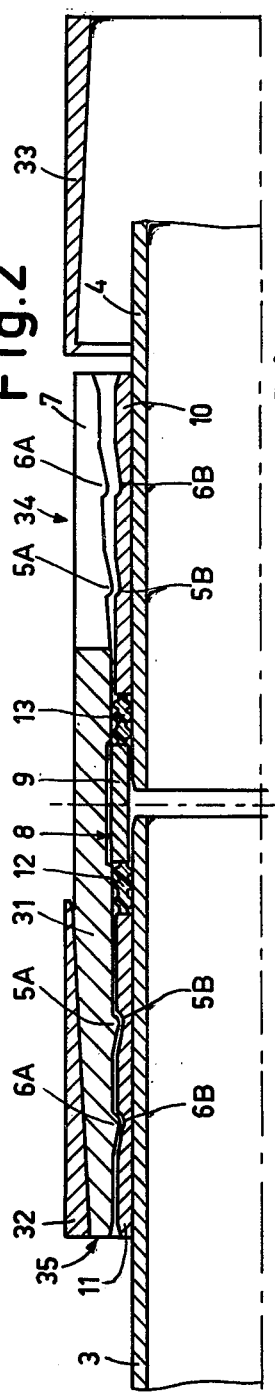

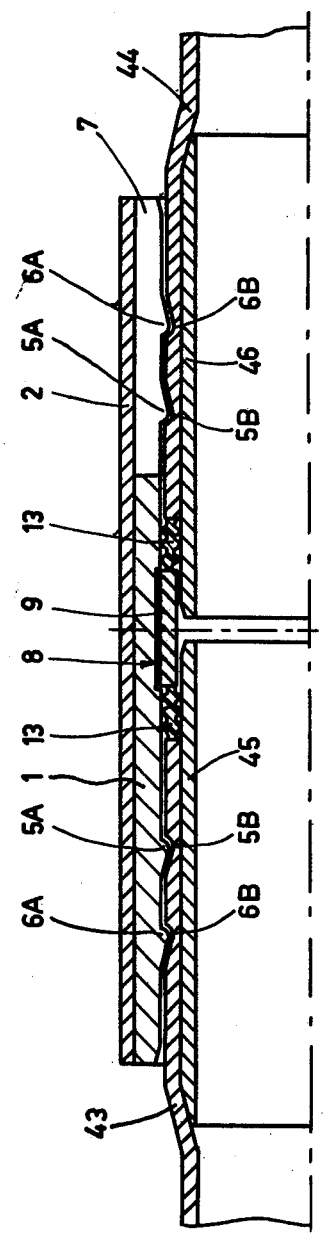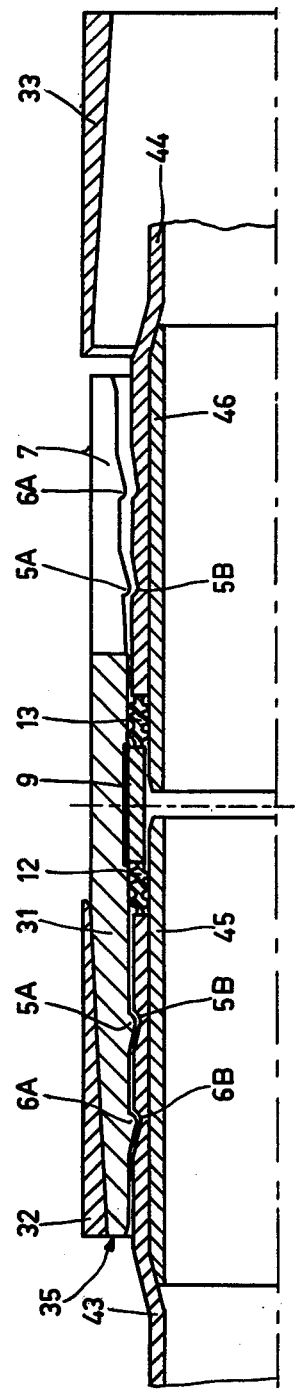

HIGH-STRENGTH PIPE COUPLING

The invention relates to a pipe coupling for the high-strength connection of tube ends comprising a tubular coupling member of synthetic resin. The invention relates in particular to a pipe coupling for the mutual high-strength connection of main conduits of synthetic resin which are used to convey liquids, such as water.

In such main conduits pipes are generally used having a diameter of 50 mm and more. To couple such synthetic resin pipes constructions are frequently used in which the high strength is obtained by means of so-called locking cords, which are located in cavities which are formed by facing grooves in the outer wall of coupling members formed as bushings which are glued or welded to the pipe ends and the inner wall of a sleeve surrounding them. Such constructions have a number of drawbacks; in particular, when stress is applied to the sleeve a tensile stress is produced in the wall of the sleeve which causes stress concentrations in the sleeve wall at the location of the grooves. In practice it appears that tensile loads, possibly combined with bending loads, frequently result in fracturing the sleeve at the grooves. The locking cords are positioned by feeding them through an opening in the sleeve wall tangentially into the cavities which are formed by facing grooves in the sleeve and coupling bushings which are fixed to the pipe ends to be coupled. If the pipe ends are not in exact registration and the grooves in the bushings and the sleeve are not accurately positioned opposite one another across the entire circumference difficulties will arise when positioning the locking cords. In practice this proved to be one of the principal causes of breaking of the locking cords during feeding them into the cavities. It also happens that the ends of locking cords which cannot be applied into the cavities are sawn off. With cords which are not fully fed into the cavities impermissible stress concentrations are produced in the sleeve wall under the grooves due to the influence of the tensile load.

SUMMARY OF THE INVENTION

The object of the invention is to prevent coupling damage resulting from stress concentrations due to tensile loads.

According to the invention, a tubular coupling sleeve of a plastic pipe coupling is internally provided at at least one end with at least one annular profile, which, after assembly in the axial direction coincides non-removably with an annular counter profile on the outer wall of a spigot formed at a pipe end, the coupling sleeve having longitudinal slots extending through the internal profile. A seal of a resilient compressible material is located between the part of the inner wall of the coupling sleeve which does not have longitudinal slots and the outer wall of the spigot. The pipe coupling further has a locking device fitting around the coupling member, which locking device is applied after the spigot has been placed into the coupling member around at least the part of the coupling member provided with longitudinal slots. The longitudinal slots serve to enable bending of the segmental wall parts of the coupling member which are located between the longitudinal slots, for example when the spigot is entered. The term counter profile on the outer wall of the spigot of a pipe must be understood to mean grooves and raised edges which are applied to the spigot of the pipe by removing metal or by deforming or by fitting bushings, having such profiles to the pipe end, for example by means of glueing or welding.

In the high-strength coupling according to the invention by mating the profile on the inner wall of the coupling sleeve and the counter profile on the outer wall of the spigots, and due to the presence of the locking device, when axial stresses are produced the spigots cannot leave the coupling sleeve. In a preferred embodiment of the invention the profile on the inner wall of the coupling sleeve consists of at least an inwardly extending annular profile having a sawtooth cross-section, the slanting side of the sawtooth being directed towards the feed-in opening for the spigot, which cooperates non-removably with a groove of a corresponding cross-section in the outer wall of the spigot, such as, for example, a bushing around the pipe end. Such bushings may be fitted to the tube ends during laying of the pipe system or may already have been fitted beforehand.

If it is not possible to provide the pipe ends with the profiled bushings as is, for example the case with a pipe of a polyolefine, such as polyethylene there is still another possibility. Then that portion of the pipe end which must be inserted into the coupling member is heated to a temperature at which this portion can be deformed whereafter the diameter is enlarged along a first length till the outside diameter corresponds to the inside diameter of the coupling member. The counter profiles in the outer wall of the pipe end can be applied simultaneously by enlarging the diameter in a mold which is suitable for the purpose. It is of course also possible, if the shape of the counter profiles is suitable to apply them by means of external metal removal after enlarging the diameter. In order to avoid radial distortion when the tensile load is applied to the pipe end having the enlarged diameter this end is internally provided with a supporting bushing. Preferably this support is of a greater length than the first length whose diameter has been enlarged. The outside diameter of the supporting bushing corresponds to the inner diameter of the portion of the pipe end having the enlarged diameter while the inside diameter of the bushing preferably corresponds to the original inside diameter of the pipe end so that no constrictions are produced. If the bushing extends from the pipe end for a second length, a contact area for a seal is obtained. The bushing may, for example, be fitted in the portion of the pipe end having the enlarged diameter by means of a press-fit or a shrink-fit.

As the supporting bushing is exposed to an external load when tensile stresses are produced on the coupling and to the pressure exerted by the seal, it is recommended to choose a bushing material which, in these circumstances, shows little or no creep, such as steel, polyvinyl-chloride and mixtures of polyvinyl-chlorides and post-chlorinated polyethylene.

In the case that the profile of the pipe end is obtained by fitting, as explained above, a bushing having an outer wall of a first length provided with counter profiles to the pipe end a contact area for a seal may be obtained by having the pipe ends extend beyond the bushing a second length at that end which will be inserted into the coupling sleeve. Then the edge of the bushing which faces the end functions as a retaining edge for the seal.

The coupling member ends are advantageously provided with a plurality of longitudinal slots which are uniformly distributed across the circumference. These slots allow a bending to the inside or to the outside of the segmental parts of the wall of the coupling sleeve which are located between the slots. The bending outwards of the segmental portions is necessary when coupling pipe ends where the outside diameter of the spigot to be inserted exceeds the inside diameter of the coupling sleeve adjacent of the profile.

Preferably the inner wall of the sleeve is provided with an annular projecting edge at the side of the wall portion provided with an annular profile, which side faces away from the opening in which the spigot is to be inserted. Such an edge may form an integral whole with the inner wall of the sleeve. According to another preferred embodiment the coupling sleeve is provided in said position with an annular recess, and a ring whose radial thickness exceeds the depth of the recess having been applied in this recess. The thickness of the ring exceeds the depth of recess by the same amount as the thickness of the bushing or of the wall portion of the pipe end which is inserted into the coupling sleeve and which is provided with a supporting bushing so that the seal is properly retained. Between a portion of the inner wall of the coupling sleeve which is free of longitudinal slots and which is situated at the side of the wall part which has one or more profiles and longitudinal slots and which faces away from the insertion opening of the pipe ends there is a seal of a resilient, compressible material. In general the seal consists of rings of synthetic or natural rubber. To obtain a proper seal various constructions may be used. In a preferred embodiment the seal consists of a ring of resilient, deformable material of a U-shaped cross-section comprising two inwardly extending sealing lugs and a coupling section which is clamped by means of a clamping ring in a groove in the inner wall of the coupling member.

The locking device may consist of a single sleeve of synthetic resin or metal which is pushed on a pipe end to receive the spigot in the coupling member. After the spigot is inserted into the coupling sleeve, the locking sleeve is pushed onto the coupling sleeve and may, if so desired be fixed in place by glueing or welding. After the locking sleeve has been applied the spigot can no longer be pulled from the coupling member because it is no longer possible for the segmental portions of the coupling element to bend outwards. Of course the locking device may also consist of one or more clamping rings.

In a special embodiment of a pipe coupling according to the invention which can be uncoupled without damaging it, the inside diameter of the portion of the coupling sleeve which is provided with a profile increases conically towards the insertion opening. A locking sleeve is used which is wedge-shaped on the inside, which, on insertion, inwardly displaces the segmental wall portions of the coupling sleeve situated between the longitudinal slots and which causes the profile on the inner wall to mate with the counter profile on the spigot. Proper engaging of the profile and the counter profile on the inner wall of the coupling sleeve and the outer wall of the spigot respectively is effected. Of course this effect can also be obtained by using clamping rings. When the wedge-shaped locking bush or the clamping rings are detached the segmental portions return to their original position, so the coupling can then be removed.

The coupling member may be double-ended for coupling to pipe ends or may, for example, be an integral part of a tapping tee, a T-piece or a pipe end.

Various embodiments of the invention will be described in detail with reference to the accompanying drawing in which:

BRIEF DESCRIPTION OF THE DRAWING

FIG. 1 is a longitudinal cross-section of a double-ended coupling sleeve for tube ends provided with a grooved bushing.

FIG. 2 is a similar view of a coupling having a different seal,

FIG. 3 shows a coupling similar to FIG. 1, but with a detachable coupling sleeve, FIG. 4 is a cross-section view of a coupling for tube ends having grooves in the tube wall, and having a supporting bushing, and FIG. 5 shows a variant of the coupling of FIG. 4 which is detachable.

DESCRIPTION OF THE PREFERRED EMBODIMENT

In FIG. 1 a double-ended tubular coupling sleeve 1 has a locking sleeve 2 pushed into place to secure the coupling over two pipe ends 3 and 4. The couplng sleeve 1 has two annular, inward ridges 5A and 6A at each end. Both ends of the coupling sleeve have longitudinal slots 7 which permit radial deflection of the wall portions of the sleeve 1 between the slots 7. An annular recess 8 which accommodates a ring 9 is located at the center of the coupling sleeve 1. The thickness of ring 9 exceeds the depth of the recess 8 in the wall of the sleeve 1. Glued to the tube ends 3 and 4 are bushings 10 and 11 which, together with the tube ends 3 and 4, form spigots. The bushings 10 and 11 are provided with a counter profile in the shape of annular grooves 5B and 6B whose shape corresponds to the shape of the ridges 5A and 6A. Sealing rings 12 and 13 are fitted on each tube end, between an edge of the ring 9, the inner wall of the coupling sleeve 1, an edge of the bushing 10 or 11 and the outer wall of the tube end 3 or 4. In this manner a gas- and liquid-tight seal can be obtained. Before the tube end 3 is inserted into the coupling sleeve 1 the locking sleeve is slipped over one of the pipe ends 3 or 4. With the shape of the profile and the counter profile shown in the drawing the segmental portions located between the longitudinal slots 7 are pushed apart when the pipe ends 3 and 4 are inserted until the ridges 5A and 6A are accommodated in the grooves 5B and 6B. Thereafter the locking sleeve 2 is pushed over the coupling sleeve 1. If desired, the locking sleeve 2 may be fixed to the coupling member 1 by glueing. It is also possible to apply clamping rings instead of a locking sleeve on the ends of the coupling member 1 which ends are provided with longitudinal slots.

FIG. 2 shows an embodiment of the coupling member 1 in which the seal is constituted by a single U-shaped ring 22. The connecting portion 23 between sealing locks 24 and 25 is held in a recess 26 in the wall of the coupling sleeve 1 by means of a clamping ring 27. The other reference numerals have the same meaning as in FIG. 1. The U-shaped seal 23/24/25 preferably consists of a resilient, deformable material of natural or synthetic rubber. The sealing locks 24 and 25 may be provided with deformable edges which results in a still better seal against the inserted pipe end. The use of an U-shaped ring 23/24/25 reduces the possibilities that leaking paths are formed, by half compared to the construction according to FIG. 1, while the ring cannot be displaced or change its position, especially when the tube ends are inserted into the coupling member.

FIG. 3 shows a detachable coupling sleeve 31 with pipe ends 3 and 4 inserted. Corresponding reference numerals have the same meaning as in the preceding figures. In the embodiment shown a coupling sleeve 31 is used whose portion 34, which is provided with ridges 5A and 6A and longitudinal slots 7, can be displaced inwards by means of a wedge-shaped locking sleeve 33 in such a way that the ridges 5A and 6A are pressed into the grooves 5B and 6B. The left half of the Figure shows the situation in which a wedge-shaped locking sleeve 32 has already been applied to the portion 35 of the coupling sleeve 31.

The embodiments which are diagrammatically shown in FIGS. 1, 2 and 3 are particularly suitable for use with coupling pipes consisting of polyvinyl chloride and mixtures of polyvinyl chloride and post-chlorinated polyethylene which have little or no tendency to creep when a load is applied. The constructions shown in FIGS. 4 and 5 are particularly suitable for use with polyethylene which does have this tendency.

In the figure mentioned below corresponding reference numerals have the same meaning as in the preceding figure.

FIG. 4 shows two pipe ends 43 and 44 which have been flared, for example by hot forming. The outer wall of the flared pipe ends have been provided with the grooves 5B and 6B by a stock removal operation. The supporting bushings 45 and 46 are fitted in the flared pipe ends. These supporting bushings consist of creep-resistant material, for example polyvinyl chloride, steel or another suitable metal. In the construction shown creep of the clamped-in pipe end cannot or substantially not occur and, in any case, cannot result in leaks in the coupling.

FIG. 5 shows a cross-section of a detachable coupling member which is also particularly intended for pipe ends of non-creep-resistant material. It will be obvious that in the construction shown in FIGS. 5 and 6 a U-shaped sealing ring as shown in FIG. 2 (23/24/25) may also be used when the shape of the coupling sleeve is modified.

The invented high-strength pipe coupling can be applied in a simple manner by unskilled labor, while the chance that the coupling is applied incorrectly is very unlikely. Moreover, it is easy to detect incorrect assembly.

What is claimed is:

1. A coupling for high-strength connection of ends of plastic pipe, comprising a spigot portion formed on a pipe end, the spigot portion having a first cylindrical length of outside diameter greater than the pipe outside diameter, and a second cylindrical length having a plain cylindrical surface of lesser diameter than said first cylindrical length and extending beyond the first cylindrical length to the adjacent terminal end of the pipe, said first length having an annular sawtooth groove formed on its outer surface, the slanting side of the sawtooth groove converging toward the said terminal end of the pipe; a coupling sleeve formed of a synthetic resin material and having a center portion having an inner wall, and an end portion, the end portion having an inwardly extending annular ridge with a counter profile to the groove and a plurality of longitudinal slots extending past the ridge but terminating short of the center portion, to permit radial flexing of portions of the end portion between the slots; a seal member arranged between the inner wall of the center portion and the outer cylindrical surface of the second cylindrical length; and a lock member tightly fitted around the coupling sleeve end portion, adapted to be so fitted around the coupling sleeve after insertion of the spigot.

2. A coupling as claimed in claim 1, wherein the first cylindrical length of the spigot is formed by a flared portion of the plastic pipe, and the spigot includes a supporting bushing made of a creep-resistant material tightly fitted within said flared portion and extending a given length beyond the adjacent terminal end of the flared portion, said extending length forming said second cylindrical length.

3. A coupling as claimed in claim 1 wherein, when the locking member is not fitted in place, the coupling sleeve assumes an unstressed shape in which the end portion has an internal conical shape generally increasing in diameter to the adjacent terminal end of the end portion, the ridge extending inwardly from a region adjacent the conical portion; and the lock member is a locking sleeve having an internal conical surface so arranged that by sliding the locking sleeve longitudinally toward the center portion of the coupling sleeve, the radially flexible portions of the coupling sleeve are pressed inwardly against the spigot.

4. A coupling as claimed in claim 1, wherein the spigot is formed by a bushing made of a synthetic resin material, permanently attached over the outer wall of the plastic pipe along said first cylindrical length, the sawtooth groove being formed in the bushing, said second cylindrical length being a given length of the plastic pipe extending beyond the bushing; and the seal member is located between the inner wall of the center portion and the outer cylindrical surface of said second cylindrical length.

5. A coupling as claimed in claim 4, wherein the inner wall of the sleeve center portion has a groove in which the seal is retained, the seal consisting of a ring of resilient deformable material having a U-shaped cross-section including two inwardly extending sealing lugs each in contact with a said second cylindrical length, and a coupling part of said seal which is retained in said groove in the center portion by a clamping ring positioned within said seal.

* * * * *